United States Patent [19]

Musha et al.

[11]  4,228,268

[45]  Oct. 14, 1980

[54] PROCESS FOR POLYMERIZING HOMOGENIZED VINYL CHLORIDE EMULSION WHICH HAD BEEN PRE-DISPERSED

[75] Inventors: Takanori Musha; Yao Terutaka, both of Takaoka, Japan

[73] Assignee: Nippon Zeon Co. Ltd., Tokyo, Japan

[21] Appl. No.: 38,731

[22] Filed: May 14, 1979

[30] Foreign Application Priority Data

May 23, 1978 [JP] Japan ................. 53-61392

[51] Int. Cl.$^2$ ............................................. C08F 14/06
[52] U.S. Cl. .................... 526/344.2; 526/330; 526/344; 526/345
[58] Field of Search .................. 526/344, 344.2, 345

[56] References Cited

U.S. PATENT DOCUMENTS

| | | | |
|---|---|---|---|
| 3,551,399 | 12/1970 | Yonezu et al. | 526/344.2 |
| 3,974,133 | 8/1976 | Evans | 526/344.2 |
| 3,980,603 | 9/1976 | Bradley et al. | 526/344.2 |
| 3,989,660 | 11/1976 | Goldsworthy et al. | 526/344.2 |
| 4,081,588 | 3/1978 | Evans et al. | 526/344 |

*Primary Examiner*—Harry Wong, Jr.
*Attorney, Agent, or Firm*—Sherman & Shalloway

[57] ABSTRACT

A process for polymerizing vinyl chloride, which comprises mixing vinyl chloride monomer or a monomeric mixture composed mainly of vinyl chloride, with water, an emulsifier, a polymerization initiator soluble in the monomer and other polymerization aids to form a preliminary dispersion in which liquid droplets of the dispersed monomer have a weight average particle diameter of 5 to 40 microns and the proportion of liquid droplets having a particle diameter of at least 50 microns is not more than 10% by weight based on the entire liquid droplets, applying a homogenizing technique to the preliminary dispersion to form a homogenized emulsion, and feeding the emulsion into a polymerization step.

10 Claims, No Drawings

PROCESS FOR POLYMERIZING HOMOGENIZED VINYL CHLORIDE EMULSION WHICH HAD BEEN PRE-DISPERSED

This invention relates to a process for the production of a vinyl chloride-type polymer used mainly as a paste.

Generally, emulsion polymerization, bulk polymerization, suspension polymerization and solution polymerization have been known heretofore as methods for producing vinyl chloride-type polymers. The suspension-polymerization technique includes (1) a method which comprises feeding vinyl or a monomeric mixture composed mainly of vinyl chloride, water, a dispersing agent, a polymerization initiator soluble in the monomer, etc. into a polymerization reactor, and polymerizing the monomer with strong agitation to form polymer particles having a weight average particle diameter of about 5 to about 300 microns, and (2) a method which comprises homogenizing vinyl chloride or a monomeric mixture composed mainly of vinyl chloride, water, an emulsifier, a polymerization initiator soluble in the monomer, and other polymerization aids in a device separate from a polymerization reactor, transferring the homogenized mixture to the polymerization reactor, and polymerizing the monomer with agitation to form fine polymer particles having a weight average particle diameter of 0.2 to 2 microns. These two methods are essentially different from each other in that the mechanism which determines the particle size resides in the inside of the polymerization vessel in method (1), but in the homogenizing step outside of the polymerization reactor in method (2).

The present invention pertains to an improvement of the method (2).

In the method for polymerizing vinyl chloride comprising the homogenizing step, the method of homogenization employed generally affects greatly the stability of the polymer latex, the formation of a coagulum (coagulated coarse polymeric particles), the adhesion of scale to the reactor, etc. The method of homogenization may include, for example, (a) circulation of an emulsion of the monomer through a homogenizer a desired number of times to form a stable homogenized mixture, and (b) increasing of a mechanical shearing force of the homogenizer to promote homogenization. The present inventors investigated into these specific embodiments using a high-pressure homogenizer. It was found that in method (a), the polymerization system becomes more stable as the number of circulating cycles increases, but since the time required for homogenization increases, the productivity becomes very poor, and moreover, when a relatively active polymerization initiator is used, heat is generated within the homogenizer to initiate polymerization, which in turn tends to cause inconveniences such as the instability of the latex and the clogging of lines by the polymer. On the other hand, in method (2), the increasing of the shearing force, i.e. the increasing of the amount of pressurization, brings about advantages such as the stabilization of the polymer latex, the decrease of the amount of a coagulum and the decrease of the adhesion of scale, but since the load on the homogenizer increases, it tends to suffer from troubles.

It is an object of this invention therefore to provide a process for polymerizing vinyl chloride comprising a step of homogenization without such inconveniences and disadvantages as described hereinabove.

It has now been found that the particle diameter of monomeric liquid droplets dispersed in the mixture before homogenization and the distribution of the particle diameters of these liquid droplets are important factors for achieving the aforesaid object.

According to this invention, there is provided a process for polymerizing vinyl chloride, which comprises mixing in an agitation tank vinyl chloride monomer or a monomeric mixture composed mainly of vinyl chloride, with water, an emulsifier, a polymerization initiator soluble in the monomer and other polymerization aids for each batch to form a preliminary dispersion in which liquid droplets of the monomer have a weight average particle diameter of 5 to 40 microns, preferably 5 to 30 microns, and the proportion of liquid droplets having a particle diameter of at least 50 microns is not more than 10% e.g. 0 to 10% by weight, preferably not more than 5% e.g. 0 to 5% by weight, based on the entire liquid droplets, applying a homogenizing technique to the preliminary dispersion to form a homogenized emulsion, and feeding the emulsion to a polymerization step.

According to another aspect which is a modification of the above process, the present invention provides a process for polymerizing vinyl chloride which comprises mixing vinyl chloride monomer or a monomeric mixture composed mainly of vinyl chloride, with water, an emulsifier, a polymerization initiator soluble in the monomer and other polymerization aids while feeding them continuously at fixed flow rates into a small-sized mixer thereby to form a preliminary dispersion in which the liquid droplets of the dispersed monomer have a weight average particle diameter of 5 to 40 microns, preferably 5 to 30 microns, and the proportion of liquid droplets having a particle diameter of at least 50 microns is not more than 10% by weight, preferably not more than 5% by weight, based on the entire liquid droplets, applying a homogenizing technique to the preliminary dispersion to form a homogenized emulsion, and feeding the emulsion into a polymerization step.

According to this process, a stable polymer latex can be obtained with a high efficiency, and the amount of the coagulum formed in the polymerization reactor and the amount of the scale adhering to the reactor can be reduced to an extremely low level or substantially zero. The process in which the preliminary dispersion is prepared continuously in a small-sized mixer is especially preferred in view of the shortening of the mixing time and the simplification of the mixing device.

If the average particle diameter of the liquid droplets of the dispersed monomer in the mixture before homogenization exceeds 40 microns, or the proportion of liquid droplets having a particle diameter of at least 50 microns exceeds 10% by weight based on the entire liquid droplets, the polymer latex becomes extremely unstable, and a large amount of coagulum forms and the adhesion of scale to the polymerization reactor increases. This mechanism is theorized as follows: If the average particle diameter of liquid droplets of the dispersed monomer is too large, or if liquid droplets having a large particle diameter are present in a proportion above a certain limit although the average particle diameter is small, the distribution of the particle diameters of liquid droplets of the emulsion of the monomer after homogenization and size reduction is broadened. Consequently, there is a distribution in the amount of the emulsifier covering the individual liquid droplets of the monomer, and unstable liquid droplets are formed before polymerization. It is presumed that as a result, the polymerization system becomes unstable.

On the other hand, according to an ordinary mixing procedure, it is difficult to reduce the weight average particle diameter of the liquid droplets to less than 5 microns, or long periods of time are required to achieve it. Moreover, reduction of the size to such a small value brings about no appreciable increase in effect, and therefore, is virtually insignificant.

In mixing a batch composed of vinyl chloride or a monomeric mixture composed mainly of vinyl chloride, with an emulsifier, a polymerization initiator and other polymerization aids the temperature of the inside of the agitating tank should be maintained usually at 5° to 40° C., preferably 20° to 35° C. To obtain the liquid droplet size defined by the present invention, it is necessary to agitate the batch for about 30 to 50 minutes at an agitating power of at least 0.3 HP (horsepower) per m$^3$ of the batch irrespective of the type of the impeller, as determined by actual measurement. The agitating time will naturally be shortened further by increasing the speed of rotation of the impeller, increasing the diameter of the impeller, increasing the number of impeller units, or providing a buffer plate, thereby to increase the agitating power. The impellers that can be used may be of known types such as Brumargim-type impellers, Pfaudler-type impellers, turbine-type impellers, paddle-type impellers or propeller-type impellers.

A pressure-resistant mixer equipped with an agitator which has a volume less than one-fourth of that of the polymerization reactor, and a static in-line mixer incorporated in a conduit path leading to a homogenization step may be cited as examples of the small-sized mixer for performing the mixing continuously. In-line mixers having a buffer plate provided therein or fillings packed therein are well known as the latter type of the small-sized mixer. The type of the small-sized mixer is not particularly limited if it has pressure-resisting properties and is designed such that pressure drop occurs when the monomer, water, etc. flow through it. As required, two or more such small-sized mixers may be used. The inside of the mixer at the time of mixing is maintained usually at a temperature of 5° to 40° C., preferably at 15° to 35° C.

To obtain liquid droplets of the dispersed monomer having the size defined by this invention by using a pressure-resistant mixer equipped with an agitator, there is used, for example, a 2-liter mixing vessel in which marine-type mixing propellers having a diameter of 40 mm are provided in two stages, and two buffle plates having a width of 3 mm are secured. To set the flow rate at about 2.4 m$^3$/hr, the rotating speed of the propellers may be adjusted to at least 800 rpm. If, however, a impeller having a stronger agitating force, such as Pfaudler-type impellers, Brumargim-type impellers or turbine-type impellers is used, liquid droplets having the desired size can be obtained at a lower rotating speed. In the case of the static in-line mixer incorporated in the conduit path, if the flow rate is about 2.4 m$^3$/hr for example, liquid droplets of the desired size can be obtained by adjusting the pressure drop ($\Delta P$) to at least 1.2 kg/cm$^2$.

The monomer, water, emulsifier, polymerization initiator and other polymerization aids are fed into the small-sized mixer in liquid or solution form and in flowable state, thereby to give uniform liquid droplets of dispersed monomer. Since the supply and mixing are performed continuously, it is ideal to maintain the feed ratios of these at fixed values. In practice, it is preferred to restrict the flow rate of each substance to be fed within ±10%.

The preliminary dispersion formed batchwise in the agitating tank or continuously in the small-sized mixer is then subjected to various known homogenizing techniques using a one-stage or two-stage high-pressure pump, colloid mill, homomixer, vibration-type agitator, high-pressure jetting from nozzles or orifices, or ultrasonic waves in order to form a homogenized emulsion.

Preferably, the flow rate per hour of the preliminary dispersion formed in the small-sized mixer at which it is fed into the homogenizing step corresponds with the flow rate per hour of the emulsion discharged from the homogenizing step. If this is difficult, a flow rate controlling buffer tank of any desired capacity may be provided, as required, between the small-sized mixer and the homogenizer.

The homogenized emulsion is then sent to a polymerization reactor, and polymerization reaction is carried out in a customary manner. For example, the polymerization temperature is 40° to 75° C. The amount of water for polymerization is within the range of 0.6 to 3 times the weight of the entire monomer, and the amounts of the emulsifier, polymerization initiator and other polymerization aids may be those conventionally used. The emulsifier, polymerization initiator, polymerization aids, etc. remain in the machinery and feed lines. A part of the water used for polymerization may be used for removing these remaining materials by washing, and the wash water may be introduced into the reactor.

The monomer used in this invention is vinyl chloride, or a mixture composed of a major proportion (usually at least 70% by weight) of vinyl chloride with a minor proportion of a monomer copolymerizable therewith. Examples of the monomer copolymerizable with vinyl chloride include olefins such as ethylene, propylene and n-butene; vinyl esters such as vinyl acetate, vinyl propionate, vinyl laurate and vinyl stearate; unsaturated acids such as acrylic acid, methacrylic acid and itaconic acid, and the esters thereof; vinyl ethers such as methylvinyl ether, ethylvinyl ether, octylvinyl ether and laurylvinyl ether; maleic acid and fumaric acid and the anhydrides or esters thereof; aromatic vinyl compounds; and unsaturated nitriles.

Suitable emulsifiers for use in this invention include ordinary anionic surface-active agents such as alkylsulfonate salts, alkylarylsulfonate salts, alkylalcohol sulfuric ester salts, fatty acid salts, and dialkylsulfosuccinate salts. The salts are generally the alkali metal salts. It is possible to use together with the anionic surfactants non-ionic surface-active agents such as glycerin esters, glycol esters or sorbitan esters of higher fatty acids, higher alcohol condensates, higher fatty acid condensates, and polypropylene oxide condensates.

In the process of this invention all known oil-soluble polymerization initiators can be used. Examples of the polymerization initiator are aromatic diacyl peroxides such as benzoyl peroxide, p-chlorobenzoyl peroxide and 2,4-dichlorobenzoyl peroxide; aliphatic diacyl peroxides having an alkyl group with 5 to 17 carbon atoms such as caproyl peroxide, lauroyl peroxide and 3,5,5-tri-methylhexanoyl peroxide; azo compounds such as azobisisobutyronitrile and azobisvaleronitrile; peroxy esters of organic acids such as t-butyl peroxypivalate; peroxy dicarbonates such as diisopropyl peroxy dicarbonate, di-2-ethylhexylperoxy dicarbonate and dioctylperoxy dicarbonate; and acetylcyclohexylsulfonyl peroxide. These initiators are used either singly or mixed with each other as a solution in a solvent or in the vinyl chloride monomer.

The other polymerization aids used in this invention include, for example, higher alcohols such as cetyl alcohol and lauryl alcohol; higher fatty acids such as lauric acid, palmitic acid and stearic acid, and the esters thereof; aromatic hydrocarbons, higher aliphatic hydrocarbons; polyvinyl alcohol; gelatin; particle size controlling agents (e.g., sodium sulfate, sodium bicarbonate); chain transfer agents; and polymerization inhibitors. They may be used either singly or mixed with each other.

The following Examples illustrate the present invention more specifically. All parts and percentages in these Examples are by weight unless otherwise specified.

this photograph, the average particle diameter of liquid droplets of the dispersed monomer was measured. The measured value was converted into a weight average particle diameter, and the distribution of the particle diameters of the liquid droplets was calculated.

The preliminary dispersion was treated under 90 kg/cm$^2$ or 400 kg/cm$^2$ using a high-pressure homogenizer (discharge capacity 4 m$^3$/hr) to form a homogenized emulsion. The emulsion was then introduced into a 200-liter stainless steel polymerization reactor the inside of which was maintained at a vacuum of 20 mmHg/20° C. The vinyl chloride monomer was polymerized at 50° C. while rotating at 100 rpm an agitator equipped with marine-type mixing propellers having a diameter of 200 mm in two stages. The results are shown in Table 2.

TABLE 1

| Run No. | | Type of impeller | Agitating Conditions | | | | Agitating power (HP) | Weight average diameter of liquid droplets (microns) | Proportion (wt. %) of liquid droplets having a size of at least 50 microns |
|---|---|---|---|---|---|---|---|---|---|
| | | | Impeller diameter (mm) | Number of impeller stages | Rotating speed (rpm) | Buffer plates | | | |
| 1 | (invention) | Brumargim | 300 | two | 350 | two | 2.0 | 10 | 0 |
| 2 | | Pfaudler | 520 | one (bottom) | 200 | two | 1.5 | 25 | 0 |
| 3 | | " | 520 | one (bottom) | 170 | none | 0.3 | 28 | 3 |
| 4 | (com- | " | 520 | one (bottom) | 150 | none | 0.2 | 34 | 12 |
| 5 | parison) | Brumargin | 300 | two | 150 | two | 0.05 | 42 | 8 |
| 6 | | " | 300 | two | 100 | two | 0.015 | 47 | 20 |

TABLE 2

| | | Homogenizing pressure (90 kg/cm$^2$) | | | | Homogenizing pressure (400 kg/cm$^2$) | | | |
|---|---|---|---|---|---|---|---|---|---|
| Run No. | | Reaction time (hr) | Conversion (%) | Rate of coagulum formation (%)* | Scale | Reaction time (hr) | Conversion (%) | Rate of coagulum formation (%)* | Scale |
| 1 | (invention) | 14 | 92 | 0.1 | Almost none | 14 | 92 | less than 0.1 | Almost none |
| 2 | | 14 | 91 | 0.2 | Almost none | 14 | 92 | 0.1 | Almost none |
| 3 | | 14 | 92 | 0.4 | Almost none | 14 | 91 | 0.2 | Almost none |
| 4 | (com- | 14 | ** | 10 | Much | 14 | ** | 8 | Much |
| 5 | parison) | 15 | ** | 25 | Much | 14.5 | ** | 16 | Much |
| 6 | | 18 (reaction was stopped) | | Blocking occurred, and no polymer latex was obtained. | | 15 | ** | 30 | Much |

*Weight percent of coarse agglomerated particles of polymer which did not pass through a 16-mesh screen (JIS) based on the amount of monomer charged.
**Since the amount of the coagulum formed and the amount of scale deposited were large, the calculation of these amounts was practically impossible.

EXAMPLE 1

An agitating tank (capacity 1 m$^3$) equipped with an agitator was charged with 130 parts of distilled water, 1.2 parts of sodium laurylsulfate, 2.3 parts of lauryl alcohol and 0.2 part of lauroyl peroxide, and the space in the tank was purged with nitrogen. The pressure of the inside of the tank was reduced, and 100 parts of vinyl chloride monomer was introduced into the tank. These materials were mixed with agitation for 30 minutes under the agitating conditions shown in Table 1 while maintaining the inside of the tank at 30° C. The resulting preliminary dispersion was taken into a cell of pressure-resistant glass, and photographed on an enlarged scale through an optical microscope. Based on It is seen from Tables 1 and 2 that when an emulsion obtained by homogenizing the preliminary dispersion meeting the conditions of this invention is to be polymerized, the polymerization reaction is stable, and the formation of coagulum and the deposition of scale were reduced.

EXAMPLE 2

An agitating tank (capacity 1 m$^3$) equipped with an agitator was charged with 130 parts of distilled water, 1.0 part of sodium dodecylbenzenesulfonate, 2.2 parts of chlorinated paraffin, and 0.03 part of t-butyl peroxy pivalate. The space in the agitating tank was purged with nitrogen, and the pressure of the inside of the tank was reduced. A mixture composed of 5 parts of vinyl acetate monomer and 95 parts of vinyl chloride monomer was introduced into the tank. The monomeric mixture was polymerized in the same way as in Example 1 under the experimental conditions shown in Table 3. The results are shown in Table 4.

TABLE 3

| Run No. | | Agitating conditions | Weight average diameter of liquid droplets (microns) | Proportion of liquid droplets having a size of at least 50 microns (wt. %) |
|---|---|---|---|---|
| 1 | (invention) | Same as in Run No. 1 of Example 1 | 12 | 0 |
| 2 | | Same as in Run No. 2 of Example 1 | 28 | 0 |
| 3 | | Same as in Run No. 3 of Example 1 | 30 | 5 |
| 4 | (comparison) | Same as in Run No. 4 of Example 1 | 38 | 14 |
| 5 | | Same as in Run No. 5 of Example 1 | 45 | 8 |
| 6 | | Same as in Run No. 6 of Example 1 | 48 | 29 |

TABLE 4

| | Homogenizing pressure (90 kg/cm$^2$) | | | | Homogenizing pressure (400 kg/cm$^2$) | | | |
|---|---|---|---|---|---|---|---|---|
| Run No. | Reaction time (hr) | Conversion (%) | Rate of Coagulum formed (%)* | Scale | Reaction time (hr) | Conversion (%) | Rate of coagulum (%)* | Scale |
| 1 | 14 | 91 | 0.2 | Almost none | 14 | 91 | 0.1 | Almost none |
| 2 | 14 | 91 | 0.3 | Almost none | 14 | 90 | 0.2 | Almost none |
| 3 | 14.5 | 90 | 0.5 | Almost none | 14 | 90 | 0.2 | Almost none |
| 4 | 14.5 | ** | 13 | Much | 14.5 | ** | 10 | Much |
| 5 | 15 | ** | 25 | Much | 14.5 | ** | 18 | Much |
| 6 | 18 (reaction was stopped) | | Blocking occurred, and no polymer latex was obtained. | | 17 | ** | All consisted of coarse large particles | |

*and **are the same as the footnote to TABLE 2.

EXAMPLE 3

The polymerization chemicals shown in Table 5 were simultaneously introduced into a static in-line mixer with a pipe diameter of 1 inch or a 2-liter pressure-resistant mixer equipped with an agitator (having two stages of marine-type mixing propellers having a diameter of 40 mm). The mixture was maintained within the mixer at a flow rate of about 40 liters/min. to prepare a preliminary dispersion.

TABLE 5

| Polymerizatin chemicals | Flow rate (l/min.)* | Flow rate controllable range (l/min.) of flow rate setting device | Parts per 100 parts of vinyl chloride |
|---|---|---|---|
| Vinyl chloride | 18 | 3–30 | 100 |
| Distilled water | 20 | 3–30 | 123 |
| 30% aqueous solution of sodium lauryl-sulfate | 0.65 | 0.1–1.0 | 1.2 (as solids) |
| 50% toluene solution of di-2-ethylhexyl-peroxy dicarbonate | 0.007 | 0.003–0.03 | 0.02 (as solids) |
| Lauryl alcohol | 0.43 | 0.1–1.0 | 2.3 |

*Variation errors ± 4%

The resulting preliminary dispersion was introduced into a high-pressure homogenizer (discharging ability 4 m$^3$/hr) through a 50-liter flow rate-controlling buffer tank, and treated under 90 kg/cm$^2$ or 400 kg/cm$^2$ to form a homogenized emulsion. The emulsion was discharged into a stainless steel polymerization reactor having a capacity of 1 m$^3$. The liquid level of the buffer tank was adjusted during this time so that the amount of the mixture introduced into the homogenizer was the same as the amount of the emulsion discharged from the homogenizer. While operating the homogenizer, 50 liters of distilled water was passed through the feed lines, mixer, buffer tank and homogenizer to remove the chemicals remaining there. The water was then introduced into the polymerization reactor and mixed with the homogenized emulsion. The polymerization reaction was performed at 50° C. while rotating the agitator equipped with two stages of marine-type propellers having a diameter of 400 mm at a rotating speed of 70 rpm (Runs Nos. 1 to 8).

Separately, a preliminary dispersion was prepared batchwise from the chemicals shown in Table 5 using a 1 m$^3$ agitating tank (having an agitator equipped with to two stages of Brumargim-type impeller with having a diameter of 300 mm, and two flat buffle plates). A homogenized emulsion was prepared in the same way as above from the resulting dispersion, and then subjected to polymerization in the same way as above (Runs Nos. 9 and 10).

The results are shown in Table 6.

TABLE 6

| | | | | | Preliminary dispersion | | | |
|---|---|---|---|---|---|---|---|---|
| Run No. | | Type of mixer | Pressure drop Δp (kg/cm$^2$) | Rotating speed of agitator (rpm) | Time required until the completion of charge of the polymerization chemicals (min.) | Time required (min.) | Weight average diameter of liquid droplets (microns)* | Proportion of liquid droplets having a particle diameter of at least 50 microns (wt. %)* | Time required for homogenization in a homogenizer (minutes) |
| invention | 1 | Static in-line mixer | 4.0 | — | 0 | 0 | 13 | 0 | 22 |

TABLE 6-continued

| | Run No. | | | | | | | |
|---|---|---|---|---|---|---|---|---|
| | 2 | Static in-line mixer | 2.0 | — | 0 | 0 | 23 | 1 | 22 |
| | 3 | Static in-line mixer | 1.2 | — | 0 | 0 | 30 | 5 | 22 |
| Comparison | 4 | Static in-line mixer | 0.8 | — | 0 | 0 | 35 | 12 | 22 |
| | 5 | Static in-line mixer | 0.6 | — | 0 | 0 | 45 | 20 | 22 |
| invention | 6 | Pressure-resistant mixer with an agitator | — | 1400 | 0 | 0 | 20 | 1 | 22 |
| | 7 | Pressure-resistant mixer with an agitator | — | 800 | 0 | 0 | 37 | 8 | 22 |
| Comparison | 8 | Pressure-resistant mixer with an agitator | — | 600 | 0 | 0 | 42 | 15 | 22 |
| invention | 9 | Agitation tank | — | 350 | 7 | 30 | 10 | 0 | 22 |
| | 10 | " | — | 350 | 7 | 25 | 24 | 8 | 22 |

| | | Homogenizing pressure (90 kg/cm$^2$) | | | | Homogenizing pressure (400 kg/cm$^2$) | | | |
|---|---|---|---|---|---|---|---|---|---|
| Run No. | | Reaction time (hr) | Conversion (%) | Rate of coagulum formed (%)** | Scale | Reaction time (hr) | Conversion (%) | Rate of coagulum formed (%)** | Scale |
| invention | 1 | 14 | 91 | less than 0.1 | Almost none | 14 | 91 | less than 0.1 | Almost none |
| | 2 | 14 | 91 | 0.1 | Almost none | 14 | 91 | 0.1 | Almost none |
| | 3 | 14 | 90 | 0.3 | Slightly deposited on the impeller tips | 14 | 90 | 0.2 | Almost none |
| Comparison | 4 | 14 | — | 10 | Much | 14 | — | 5 | Much |
| | 5 | 15 | No polymer latex was obtained because of blocking. | | | 15 | *** | Consisted entirely of large coarse particles | | " |
| invention | 6 | 14 | 90 | 0.1 | Almost none | 14 | 91 | 0.1 | Almost none |
| | 7 | 14 | 90 | 0.9 | Slightly deposited on the impeller tips | 14 | 90 | 0.5 | Slightly deposited on the impeller tips |
| Comparison | 8 | 15 | *** | Consisted solely of large coarse particles | Much | 15 | — | 10 | Much |
| invention | 9 | 14 | 91 | less than 0.1 | Almost none | — | — | — | — |
| | 10 | 14 | 91 | 0.1 | Almost none | — | — | — | — |

(Note)
*The preliminary dispersion was taken into a pressure-resistant glass cell from the outlet of the mixer, and photographed on an enlarged scale through an optical microscope. Based on this, the average particle diameter of liquid droplets was measured. The measured value was converted into a weight average particle diameter.
**The proportion (wt. %) of coarse agglomerated polymer particles which did not pass through a 16-mesh screen based on the monomer charged.
***Since the amounts of coagulum formed and scale deposited were large, the calculation of these amounts was substantially impossible.

EXAMPLE 4

Example 3 was repeated accept that the polymerization chemicals shown in Table 7 were used. The results are shown in Table 8.

TABLE 7

| Polymerization chemicals | Flow rate (l/min.)* | Flow rate controllable range (l/min.) of a flow rate-setting device | Parts per 100 parts of the monomer |
|---|---|---|---|
| Vinyl chloride | 17 | 3–30 | 94 |
| Vinyl acetate | 1.1 | 0.3–3 | 6 |
| Distilled water | 20 | 3–30 | 123 |
| 30% Aqueous solution of sodium dodecylbenzenesulfonate | 0.54 | 0.1–1.0 | 1.0 (as solids) |
| 50% Toluene solution of t-butylperoxy pivalate | 0.011 | 0.003–0.03 | 0.03 (as solids) |
| Chlorinated paraffin | 0.3 | 0.1–1.0 | 2.2 |

*Variation errors ± 4%

TABLE 8

| Run No. | | Type of mixer | Pressure drop Δp (kg/cm²) | Rotating speed of agitator (rpm) | Time required until the completion of charge of the polymerization chemicals | Preliminary dispersion | | Time required for homogenization in a homogenizer (minutes) |
|---|---|---|---|---|---|---|---|---|
| | | | | | | Time required (min.) | Weight average diameter of liquid droplets (microns) * | Proportion of liquid droplets having a particle diameter of at least 50 microns (wt. %)* | |
| invention | 1 | Pressure-resistant mixer with an agitator | — | 1400 | 0 | 0 | 22 | 1 | 22 |
| | 2 | Pressure-resistant mixer with an agitator | — | 800 | 0 | 0 | 38 | 9 | 22 |
| Comparison | 3 | Pressure-resistant mixer with an agitator | — | 600 | 0 | 0 | 42 | 17 | 22 |
| invention | 4 | Static in-line mixer | 4.0 | — | 0 | 0 | 15 | 0 | 22 |
| | 5 | Static in-line mixer | 2.0 | — | 0 | 0 | 24 | 1 | 22 |
| | 6 | Static in-line mixer | 1.2 | — | 0 | 0 | 30 | 5 | 22 |
| Comparison | 7 | Static in-line mixer | 0.8 | — | 0 | 0 | 37 | 13 | 22 |
| | 8 | Static in-line mixer | 0.6 | — | 0 | 0 | 46 | 23 | 22 |
| invention | 9 | (Agitation tank) | — | 350 | 9 | 30 | 12 | 0 | 22 |
| | 10 | (Agitation tank) | — | 350 | 9 | 25 | 25 | 2 | 22 |

| Run No. | | Homogenizing pressure (90 kg/cm²) | | | | Homogenizing pressure (400 kg/cm²) | | | |
|---|---|---|---|---|---|---|---|---|---|
| | | Reaction time (hr) | Conversion (%) | Rate of coagulum formed (%)** | Scale | Reaction time (hr) | Conversion (%) | Rate of coagulum formed (%)** | Scale |
| invention | 1 | 14 | 91 | 0.1 | Almost none | 14 | 91 | less than 0.1 | Almost none |
| | 2 | 14 | 88 | 0.2 | Slightly deposited on the impeller tips | 14 | 90 | 0.8 | Slightly deposited on the impeller tips |
| Comparison | 3 | 15 | *** | Consisted solely of large coarse particles | Much | 15 | *** | consisted only of coarse large particles | Much |
| invention | 4 | 14 | 91 | less than 0.1 | Almost none | 14 | 91 | less than 0.1 | Almost none |
| | 5 | 14 | 90 | 0.1 | Almost none | 14 | 91 | 0.1 | Almost none |
| | 6 | 14 | 90 | 1.3 | Slightly deposited on the impeller tips | 14 | 91 | 0.2 | Almost none |
| Comparison | 7 | 16 | — | 12 | Much | 14 | — | 7 | Much |
| | 8 | 18 (Stopped) | No latex was obtained because of blocking. | | | 16 | *** | Consisted solely of coarse large particles | " |
| invention | 9 | 14 | 91 | less than 0.1 | Almost none | — | — | — | — |
| | 10 | 14 | 90 | 0.1 | Almost none | — | — | — | — |

*,  and * are the same as the foot note to TABLE 6.

It is seen from Examples 3 and 4 that to achieve the object of this invention, the conditions relating to the particle size of liquid droplets of the dispersed monomer are very important.

What we claim is:

1. A process for polymerizing vinyl chloride, which comprises mixing in an agitation tank vinyl chloride monomer or a monomeric mixture composed of a major proportion of vinyl chloride and a minor proportion of a monomer copolymerizable therewith, with water, an emulsifier, a polymerization initiator soluble in the vinyl monomer and polymerization aids for each batch to form a preliminary dispersion in which liquid droplets of the vinyl chloride monomer have a weight average particle diameter of 5 to 40 microns, wherein the proportion of liquid droplets having a particle diameter of at least 50 microns is 0 to 10% by weight, based on the entire liquid droplets, applying a homogenizing technique to the preliminary dispersion to form a homogenized emulsion, and feeding the emulsion to a polymerization step and polymerizing said emulsion.

2. The process of claim 1 wherein the temperature of the inside of the agitation tank is from 5° to 40° C.

3. The process of claim 1 wherein the liquid droplets of the dispersed monomer have a weight average particle diameter of from 5 to 30 microns.

4. The process of claim 1 wherein the proportion of liquid droplets having a weight average particle diameter of at least 50 microns based on the entire liquid droplets of the monomer dispersed is 0 to 5% by weight.

5. A process for polymerizing vinyl chloride which comprises mixing vinyl chloride monomer or a monomeric mixture composed of a major proportion of vinyl chloride and a minor proportion of a monomer copolymerizable therewith, with water, an emulsifier, a polymerization initiator soluble in the vinyl chloride monomer and other polymerization aids while feeding them continuously at fixed flow rates into a small-sized mixer thereby to form a preliminary dispersion in which the liquid droplets of the dispersed vinyl chloride monomer have a weight average particle diameter of 5 to 40 microns, and the proportion of liquid droplets having a particle diameter of at least 50 microns is 0 to 10% by weight based on the entire liquid droplets, applying a homogenizing technique to the preliminary dispersion to form a homogenized emulsion, and feeding the emulsion into a polymerization step and polymerizing said emulsion.

6. The process of claim 5 wherein the temperature of the inside of the small-sized mixer is from 5° to 40° C.

7. The process of claim 5 wherein the liquid droplets of the dispersed vinyl chloride monomer have a weight average particle size of from 5 to 30 microns.

8. The process of claim 5 wherein the proportion of the liquids having a weight average particle diameter of at least 50 microns is 0 to 5% by weight based on the entire liquid droplets of the monomer dispersed.

9. The process of claim 5 wherein the small-sized mixer is a mixer having a capacity not more than one-fourth of that of the polymerization reactor and equipped with an agitator, or a static in-line mixer incorporated in a conduit path leading to the homogenizing step.

10. The process of claim 5 wherein the vinyl chloride monomer of the monomeric mixture composed of a major proportion of vinyl chloride and a minor proportion of a monomer copolymerizable therewith, with water, emulsifier, polymerization initiator and other polymerization aids are fed into the small-sized mixer in liquid or solution form and in the flowable state.

* * * * *

UNITED STATES PATENT AND TRADEMARK OFFICE
CERTIFICATE OF CORRECTION

PATENT NO. : 4,228,268
DATED : October 14, 1980
INVENTOR(S) : Musha et al.

It is certified that error appears in the above—identified patent and that said Letters Patent is hereby corrected as shown below:

Inventors: Delete "Yao Terutaka" and insert -- Terutaka Yao

Signed and Sealed this

Tenth Day of February 1981

[SEAL]

Attest:

RENE D. TEGTMEYER

Attesting Officer

Acting Commissioner of Patents and Trademarks